Patented July 5, 1949

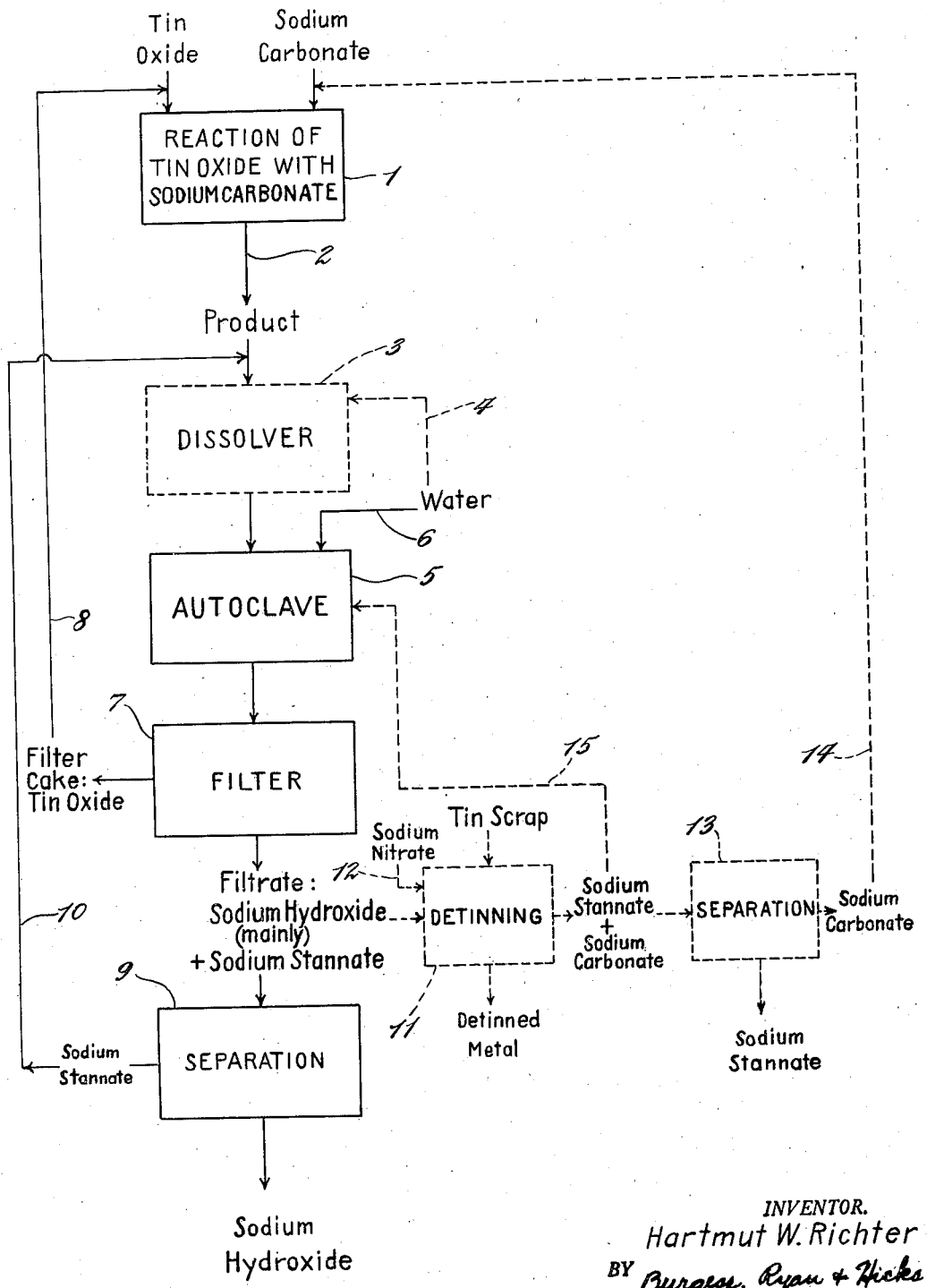

2,474,916

UNITED STATES PATENT OFFICE 2,474,916

PRODUCTION OF CAUSTIC SODA

Hartmut W. Richter, Rahway, N. J., assignor to Metal & Thermit Corporation, New York, N. Y., a corporation of New Jersey Application October 28, 1947, Serial No. 782,482

8 Claims. (Cl. 23—184)

This invention relates to a process for manufacturing caustic soda from sodium carbonate and broadly comprises converting the carbonate by means of tin oxide to sodium stannate and then converting the stannate to caustic soda and tin oxide. The tin oxide initially employed is continuously regenerated and reused so that the net result of the process is the conversion of sodium carbonate to caustic soda.

More specifically, the process comprises reacting together sodium carbonate and tin oxide at elevated temperatures to form sodium stannate in dry granular form, dissolving the stannate in water, heating the dissolved stannate at a temperature in the range of about 150° C. to the critical temperature of water and at a pressure sufficient to maintain a liquid phase throughout said temperature range, whereby tin oxide and free caustic soda are formed, and then separating the tin oxide from the caustic soda.

As will become apparent hereinafter, the invention also provides a method of producing sodium stannate in dry granular form by means of a dry reaction between sodium carbonate and tin oxide.

The invention may be better understood from the description that follows taken in connection with the accompanying drawing in which certain desirable optional steps are shown by means of dotted lines.

Tin oxide and sodium carbonate from any source, at least a portion of which may be obtained as hereinafter described, are reacted together in a reaction zone 1 to produce sodium stannate. The reaction may be set forth in the form of an equation as follows:

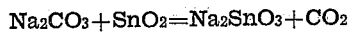

$$Na_2CO_3 + SnO_2 = Na_2SnO_3 + CO_2$$

The sodium carbonate may be of any quality, either pure or of a commercial grade or in crude form. Preferably the concentrations of the carbonate and tin oxide are the stoichiometrical amounts required by the foregoing equation, as it is then possible to obtain a product which is substantially completely soluble in water and which comprises essentially sodium stannate in a dry granular form. It is, however, possible to employ excess tin oxide without impairing the dry granular form of the stannate, the excess merely appearing in the product. In this case, however, the product will not be completely soluble in water. Excess sodium carbonate may also be used, and while this permits a lower reaction temperature to be employed, it results in a fused reaction mixture which is less conveniently handled than the dry granular stannate material. The reaction temperature may be about 800–1200° C., preferably 1000–1100° C., while the pressure may be atmospheric. The reaction time is variable, a generally suitable reaction time being about 30 minutes, although lower and higher times are possible, say ¼ to 1 or 2 hours. In general, the temperature varies with the time, lower temperatures requiring longer times and vice versa. Any suitable equipment may be employed for the reaction, such as, for example, a direct fired rotary calciner.

The yield of sodium stannate is quantitative when stoichiometrical amounts of the reactants are used. In such case, as stated, the stannate is in dry granular form and easy to handle. If excess tin oxide is used, the yield of stannate will be quantitative as respects the conversion of the sodium carbonate. If excess sodium carbonate is employed, the yield will be quantitative as regards the conversion of tin oxide.

Following the reaction, the product may be passed through line 2 to dissolver 3, water being added through line 4 to dissolve the material. Preferably, however, the product is passed directly to an autoclave 5 where it may be heated in the presence of water to dissolve it preparatory to converting the stannate to free caustic soda and tin oxide. Water may be added to the autoclave via line 6. It will be understood that other equipment besides an autoclave may be employed so long as it is suitable for heating the stannate solution under pressure. For example, a coil, which is suitable for batch or continuous operation, may be used. An autoclave, however, has been found to be satisfactory.

In the conversion or autoclave zone 5 the sodium stannate in aqueous solution is converted under heat and pressure conditions to caustic soda and tin oxide. The reaction may be expressed by the following equation:

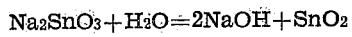

$$Na_2SnO_3 + H_2O = 2NaOH + SnO_2$$

The stannate solution may vary widely in concentration from dilute solutions containing, say, 5% by weight or less of the stannate, to slurries, which contain undissolved stannate. Some free alkali may or may not be initially present in the solution, depending upon the source of the initial carbonate material and upon process variations hereinafter described. Also, less concentrated solutions than those mentioned may be treated, this being a matter of choice or of economics. The solutions may or may not contain other constituents such as sodium carbonate, sodium chloride, sodium soaps, and the like, which may be introduced thereto depending upon the quality of the initial carbonate or upon process variations to be described.

The temperature at which the solution is heated is desirably in the range of about 150° C. to the critical temperature of water (approximately 374° C.). It has been found that the yield of caustic soda tends to be greater at higher temperatures, and for this reason temperatures in excess of 150° C. are preferred. Preferably, the lower temperature limit is about 180° C. Sufficient pressure is always employed to maintain a liquid phase at all times during the heating. Thus at the initial temperature of 150° C. the pressure for sodium stannate solutions may be about 70 p. s. i. At higher temperatures the pressure is higher, ranging to 1000-1500 p. s. i. and more. For a given temperature the pressure may be higher than that necessary to maintain a liquid phase. It has been found that for the average stannate solutions comprising merely stannate and water, the steam-water vapor pressure relationship substantially holds.

The time of heating the stannate solution is preferably such as to enable the maximum amount of caustic soda to be formed. Broadly speaking, the time may vary from a few minutes to several hours, say ¼ to 3 or 4 hours, but in practice, equilibrium between the sodium stannate and the products resulting from it may be usually attained in about a half hour. In general, the higher the free alkali present in the system, the higher will be the temperature required, and with higher temperatures the time will tend to be shorter.

During the autoclaving reaction tin oxide is progressively formed and precipitated, while the free caustic soda that is formed simply dissolves in the solution. At the end of the reaction the contents of the autoclave, including small amounts of unchanged sodium stannate, may be passed to a filter zone 7 for separation of the tin oxide, and the filtrate may be subjected to a further separation to remove unchanged sodium stannate.

The autoclaving reaction may be illustrated by the following table of data in which are presented the results of a number of runs in each of which a sodium stannate-containing solution was heated under definite conditions of tin and initial free alkali concentrations, temperature, pressure and time.

of each experiment and leaving a liquid remaining which in the table is referred to as "Filtrate." The tin and free caustic soda concentration of the filtrate are listed, and in each case it will be noted that the free caustic soda content of the filtrate is higher than in the original solution, the gain representing the amount of alkali generated from the original stannate, as indicated in the last column of the table. Yields of caustic soda may average about 80% by weight of the theoretical. The tin content of the filtrate represents that present in unchanged sodium stannate.

The precipitated and filtered tin oxide may be passed through line 8 to the reaction zone 1 to be reacted with additional quantities of sodium carbonate. The filtrate, which comprises mainly sodium hydroxide and some unchanged sodium stannate, may be separated in zone 9 into sodium stannate and sodium hydroxide. The sodium stannate may be recycled via line 10 to join the stannate material in line 2. The sodium hydroxide may be removed as product. Any suitable method of separating the sodium hydroxide from the stannate may be employed. For example, in one method the filtrate may be evaporated until sodium stannate precipitates and this may then be filtered, leaving behind a concentrated solution of sodium hydroxide suitable for commercial use. In an alternative method, the filtrate may be treated with calcium hydroxide to produce calcium stannate as a precipitate. The latter may then be filtered from the solution, leaving the caustic soda solution as product.

As shown in the drawing, the filtrate from the autoclaving step may be passed in an optional or alternative step to a detinning operation in zone 11. Suitable quantities of an oxidizing agent which is compatible with alkali, say sodium nitrate, and water, if necessary, may be added to the solution via line 12 to form a detinning solvent, comprising, say, 5 to 30% by weight of free caustic soda and 1 to 5% by weight of sodium nitrate. The tin scrap is then treated with this solvent in any desired manner. The solvent dissolves all the tin from the scrap to form sodium stannate and sodium carbonate, the latter being the result of the carbonation of the sodium hydroxide by air or other substances present in the scrap. The detinned metal is removed from the detinning zone as shown, while the solution may be passed to zone 13 and separated in known manner, say by evaporation, into sodium stan-

| Example No. | Material Treated | | Temp. °C. | Gauge Press., p. s. i. | Heating Time, hrs. | Filtrate | | Tin Recovery, Per Cent | Free Caustic Soda Generated Per Cent [1] |
|---|---|---|---|---|---|---|---|---|---|
| | Sodium Stannate, g./l. of Tin | Free Caustic Soda, g./l. of NaOH | | | | Tin g./l. | Free NaOH, g./l. | | |
| 1 | 94.5 | 6.8 | 235 | 430 | 3 | 29.6 | 48.7 | 68.6 | 94 |
| 2 | 173.6 | 10.2 | 300 | 1,260 | ½ | 27.3 | 110.1 | 84 | 100+ |
| 3 | [2] 300 | 0 | 300 | 1,260 | 1 | 42.5 | 132 | 68 | 66 |
| 4 | [3] 78.4 | 9.8 | 276 | 1,000 | 1 | 15.0 | 41.2 | 81 | 60 |

[1] Based on theoretical amount generable.
[2] A slurry.
[3] An impure solution, containing sodium carbonate, sodium chloride, sodium nitrate, sodium sulfate, soaps, etc.

In each example given the stannate solution appearing in the column "Material treated" was heated with agitation in an autoclave to the temperature listed and held at such temperature under the time and pressure conditions shown. As a result of such treatment, tin oxide was progressively formed and precipitated in the solution, being separated therefrom at the conclusion nate and sodium carbonate. The stannate may be removed as product and used as desired, while the carbonate, which is recoverable in solid form, is advantageously recycled by line 14 to the reaction zone 1 to react with additional quantities of tin oxide. Alternatively, the solution of stannate and carbonate prior to separation may be sent to the autoclave via line 15 in the event that additional sodium stannate may be required there.

The following examples may illustrate the invention.

Example 5

As an illustration of the process shown in the full line flow of the drawing, sodium carbonate and tin oxide are reacted with each other in stoichiometrical concentrations to give a quantitative yield of sodium stannate. Thus, 106 lbs. of carbonate react with 150.7 lbs. of tin oxide to give 212.7 lbs. of stannate. This amount of stannate is completely dissolved in water and converted to free caustic soda and tin oxide, the conversion being 80% of the theoretical, to form 64 lbs. of caustic soda and 120.5 lbs. of tin oxide. Twenty per cent of the stannate, or 42.5 lbs., remains unchanged, but it becomes hydrated in the aqueous solution to form 53.5 lbs. of the hydrate $Na_2Sn(OH)_6$, which may then be separated from the caustic and recycled to the autoclave.

Example 6

In this case crude sodium carbonate obtained from a detinning operation was reacted with tin oxide, the following material balance data being obtained. On the basis of 100 lbs., the crude carbonate in solid form comprised about 3.6 lbs. of tin, 60 lbs. of sodium carbonate, and 30 lbs. of water, the balance including other sodium salts of organic and inorganic nature, and other impurities. The tin, of course, was in combined form as sodium stannate. The 100 lbs. charge of crude carbonate was reacted in zone 1 with 62 lbs. of tin oxide ($SnO_2$) at a temperature of 1200° C. The product was then dissolved in water and autoclaved at 300° C. for about one hour at about 1100 p. s. i., from which operation there was produced 51 lbs. of tin oxide as a precipitate and a filtrate comprising 10.2 lbs. of tin (in combined form) and 27.6 lbs. of free caustic soda.

It will be evident that out of every 100 lbs. of crude carbonate, which formerly was thrown away, there can be obtained 27.6 lbs. (27.6%) of free caustic soda of commercial quality.

In this example most of the tin oxide entering zone 1 was recovered in the autoclaving step. The deficiency can be made up by recycling the stannate separated from the free caustic soda in zone 9.

It will be apparent that the invention provides a useful method of converting cheap sodium carbonate to the more expensive caustic soda. The advantages of the invention are more marked when it is realized that sodium carbonate from any source may be processed. The cost of carbonate material is proportionate to its quality, so that the cruder the material the greater are the savings that may be realized. As above described, crudes may be treated which heretofore were wasted. In the case of crude carbonate obtained from detinning operations, other valuable materials may also be salvaged, such as tin, without resorting to special recovery steps.

In the light of the foregoing description, the following is claimed:

1. Process of producing caustic soda from sodium carbonate which comprises reacting together stoichiometrical amounts of sodium carbonate and tin oxide at a temperature of about 800 to 1200° C. to form sodium stannate in dry granular form, dissolving said stannate in water, heating the dissolved stannate at a temperature in the range of about 150° C. to the critical temperature of water and at a pressure sufficient to maintain a liquid phase throughout said temperature range whereby tin oxide and free caustic soda are formed, some of said dissolved stannate remaining unchanged, separating the tin oxide and recycling it to the first mentioned reaction step to react with an additional quantity of sodium carbonate, adding sodium nitrate to the remaining solution of unchanged stannate and caustic soda to form a detinning solvent, detinning tin scrap with said solvent to form additional quantities of sodium stannate and also sodium carbonate, separating the carbonate from the stannate, and recycling the carbonate to the first mentioned reaction step to react with an additional quantity of tin oxide.

2. Process of producing caustic soda from sodium carbonate which comprises reacting together stoichiometrical amounts of sodium carbonate and tin oxide at a temperature of about 800 to 1200° C. to form sodium stannate in dry granular form, dissolving said stannate in water, heating the dissolved stannate at a temperature in the range of about 150° C. to the critical temperature of water and at a pressure sufficient to maintain a liquid phase throughout said temperature range whereby tin oxide and free caustic soda are formed, some of said dissolved stannate remaining unchanged, separating the tin oxide, adding sodium nitrate to the remaining solution of unchanged stannate and caustic soda to form a detinning solvent, detinning tin scrap with said solvent to form additional quantities of sodium stannate and also sodium carbonate, separating the carbonate from the stannate, and recycling the carbonate to the first mentioned reaction step.

3. Process of producing caustic soda from sodium carbonate which comprises reacting together stoichiometrical amounts of sodium carbonate and tin oxide at a temperature of about 800 to 1200° C. to form sodium stannate in dry granular form, dissolving said stannate in water, heating the dissolved stannate at a temperature in the range of about 150° C. to the critical temperature of water and at a pressure sufficient to maintain a liquid phase throughout said temperature range whereby tin oxide and free caustic soda are formed, some of said dissolved stannate remaining unchanged, separating the tin oxide and recycling it to the first mentioned reaction steps to react with an additional quantity of sodium carbonate, separating said stannate from the caustic soda and recycling the same to the stannate heating step, and recovering the free caustic soda.

4. Process of producing caustic soda from sodium carbonate which comprises reacting together stoichiometrical amounts of sodium carbonate and tin oxide at a temperature of about 800 to 1200° C. to form sodium stannate in dry granular form, dissolving said stannate in water, heating the dissolved stannate at a temperature in the range of about 150° C. to the critical temperature of water and at a pressure sufficient to maintain a liquid phase throughout said temperature range whereby tin oxide and free caustic soda are formed, some of said dissolved stannate remaining unchanged, separating the tin oxide, separating said stannate from the caustic soda and recycling the same to the stannate heating step, and recovering the free caustic soda.

5. Process of producing caustic soda from sodium carbonate which comprises reacting together stoichiometrical amounts of sodium carbonate and tin oxide at a temperature of about 800 to 1200° C. to form sodium stannate in dry granular form, dissolving said stannate in water, heating the dissolved stannate at a temperature in the range of about 150° C. to the critical temperature of water and at a pressure sufficient to maintain a liquid phase throughout said temperature range whereby tin oxide and free caustic soda are formed, separating the tin oxide and recycling it to the first mentioned reaction step to react with an additional quantity of sodium carbonate, and recovering the free caustic soda.

6. Process of producing caustic soda from sodium carbonate which comprises reacting together sodium carbonate and tin oxide at a temperature of about 800 to 1200° C. to form sodium stannate, dissolving said stannate in water, heating the dissolved stannate at a temperature in the range of about 150° C. to the critical temperature of water and at a pressure sufficient to maintain a liquid phase throughout said temperature range whereby tin oxide and free caustic soda are formed, separating the tin oxide, and recovering the free caustic soda.

7. Process of producing caustic soda from sodium carbonate which comprises reacting together sodium carbonate and tin oxide at a temperature of about 800 to 1200° C. to form sodium stannate, dissolving said stannate in water, heating the dissolved stannate at a temperature in the range of about 150° C. to the critical temperature of water and at a pressure sufficient to maintain a liquid phase throughout said temperature range whereby tin oxide and free caustic soda are formed, and separating the tin oxide.

8. Process of producing sodium stannate in dry granular form which comprises reacting together stoichiometrical amounts of sodium carbonate and tin oxide at a temperature of about 800 to 1200° C. to form a product which is substantially completely soluble in water and which comprises essentially sodium stannate in dry granular form.

HARTMUT W. RICHTER.

No references cited.